May 27, 1952 M. GARLAND 2,598,249
ROTARY SNOWPLOW
Filed April 6, 1945 3 Sheets-Sheet 2
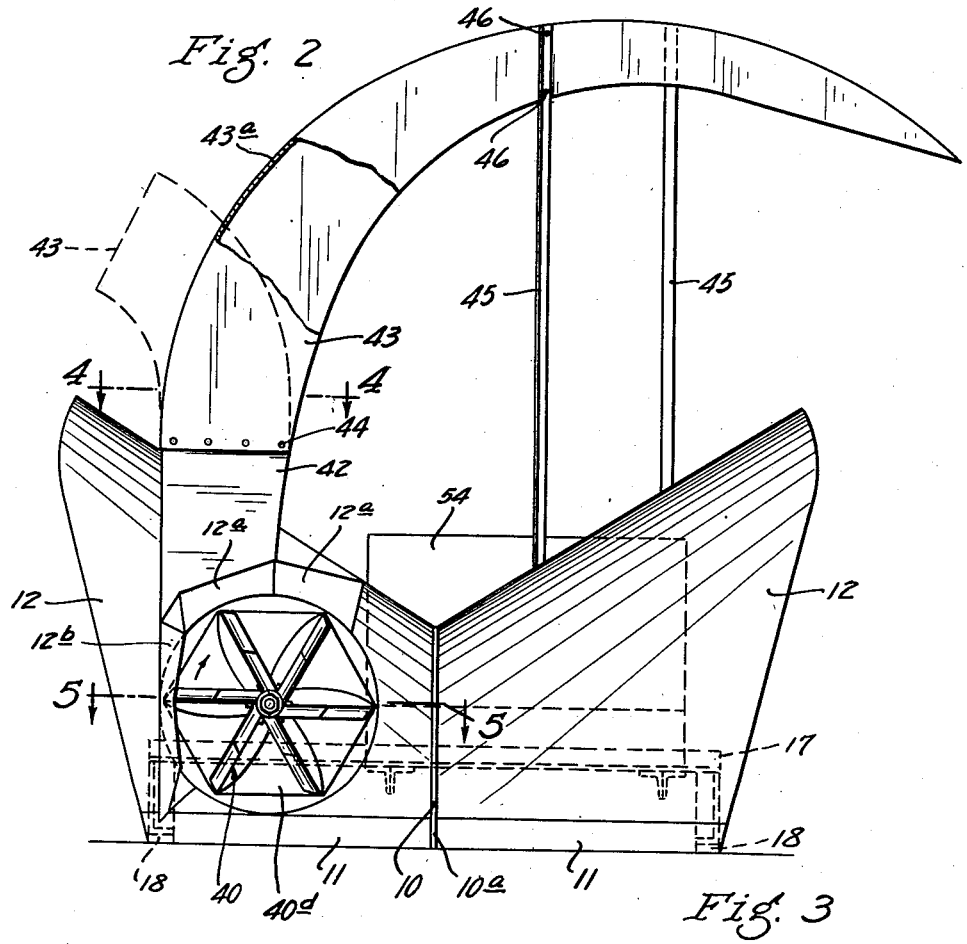
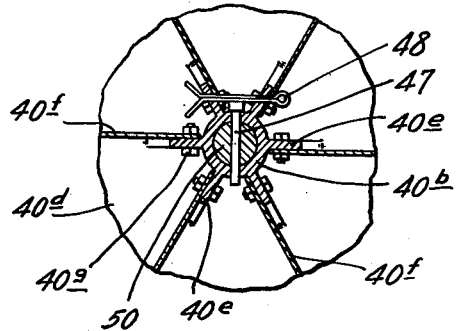
INVENTOR
Mather Garland
BY HIS ATTORNEYS
Williamson & Williamson

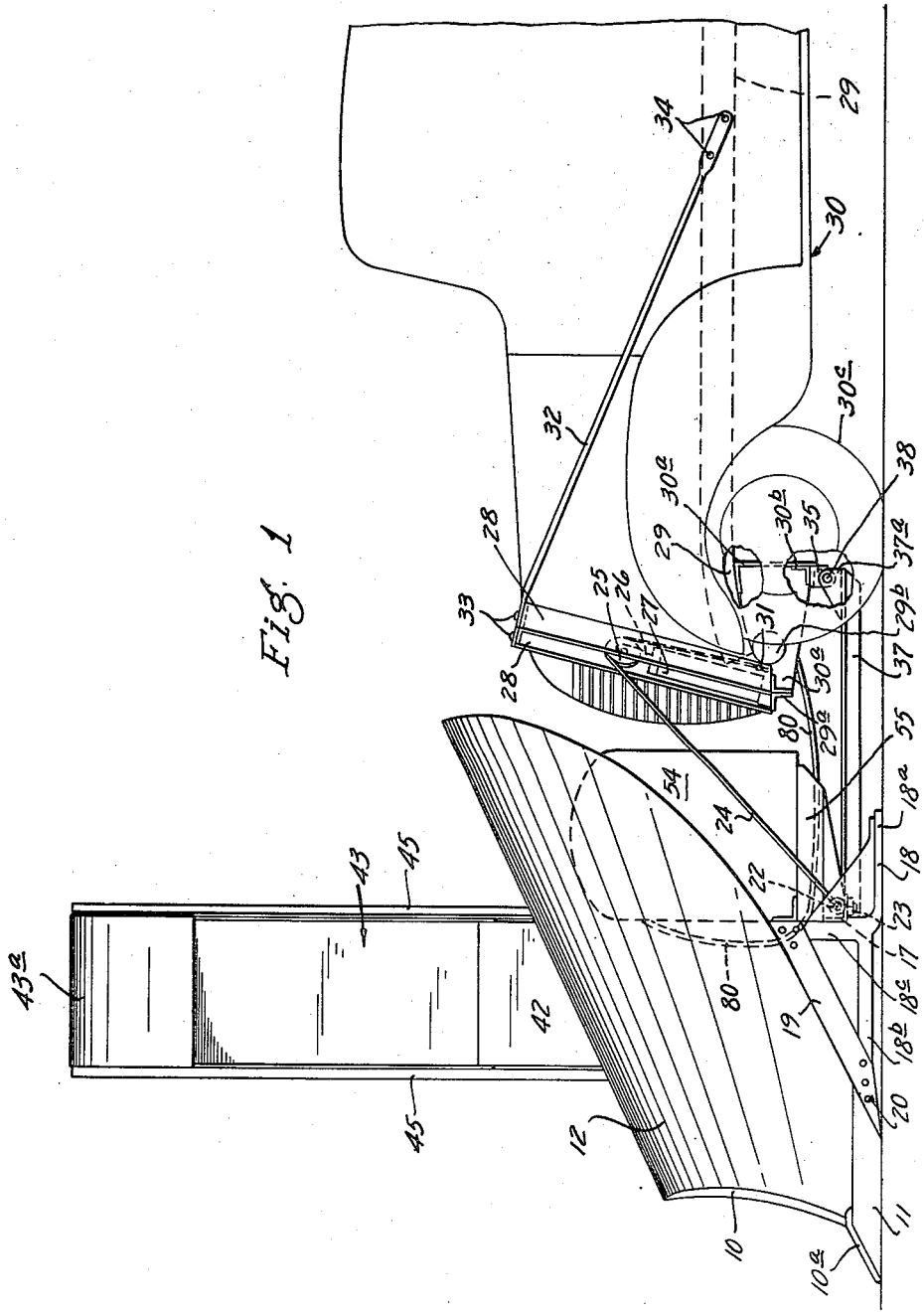

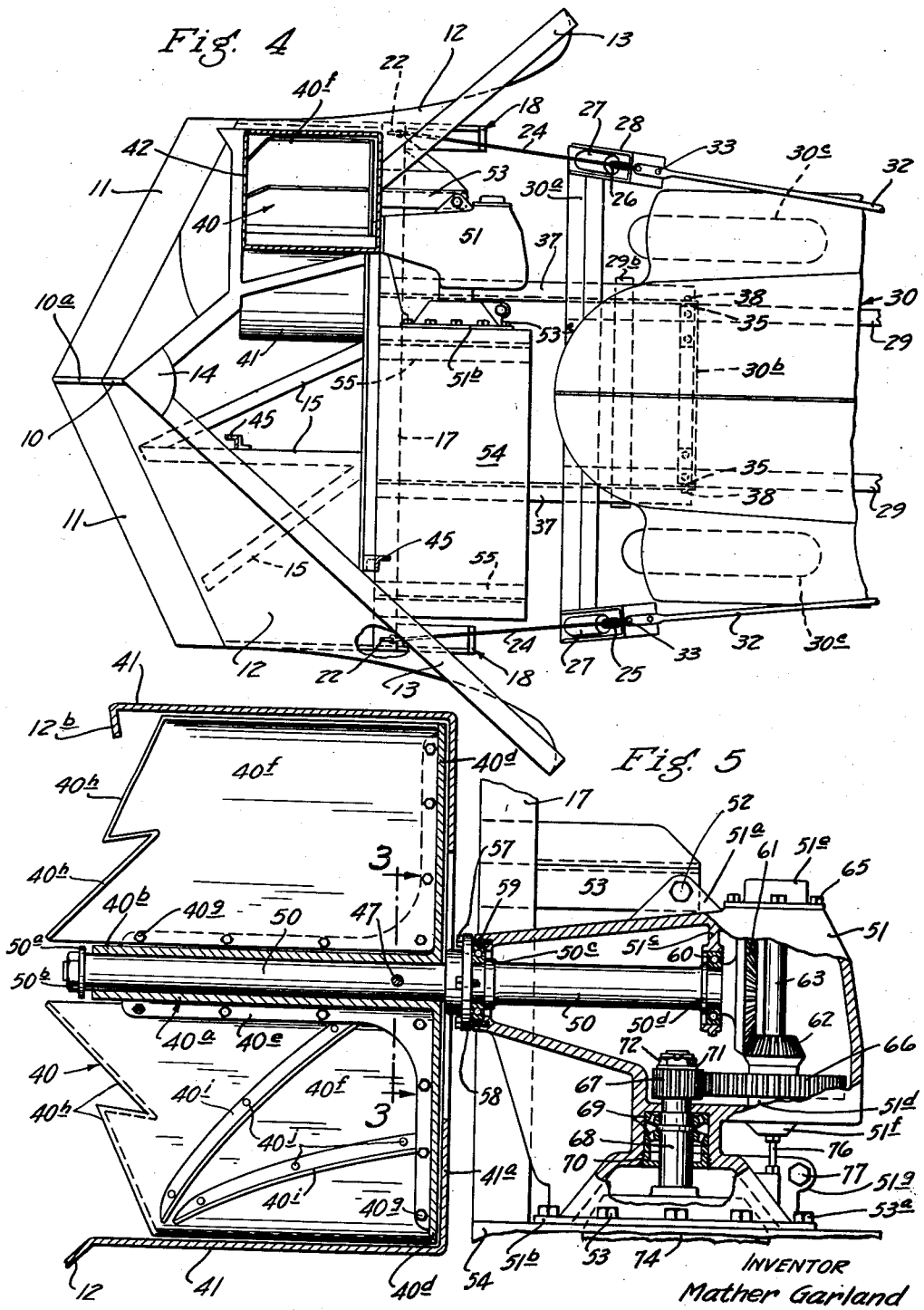

Patented May 27, 1952

2,598,249

UNITED STATES PATENT OFFICE 2,598,249

ROTARY SNOWPLOW

Mather Garland, Mound, Minn.

Application April 6, 1945, Serial No. 586,857

2 Claims. (Cl. 37—43)

This invention relates to power-operated plows of the rotary type adapted for use in moving and centrifugally discharging snow or other material from the surfaces of roadways, fields, and the like. While the invention is herein illustrated in connection with a relatively large plow adapted to be moved forwardly by a traction vehicle such as a truck or tractor, and while some phases of the invention hereof are peculiar to this relatively large variety of plow, certain phases of the instant invention are, nevertheless, applicable to other varieties of rotary plow, such, for example, as to the relatively small manually-guided plow structure of my co-pending application executed of even date herewith Serial Number 585,527 and bearing title "Rotary Snow Plow," now Patent No. 2,536,166.

A broad object of the present invention is the provision of a plow of so-called rotary type which can be constructed at relatively low cost, will require a minimum of mechanical servicing, and which will move and discharge more snow or other material per unit of power consumed than is possible with products of the prior art.

Another important object of the invention is the provision of an improved blower construction for rotary snow plows, wherein the tendency to choke the rotor, stall the driving engine or motor, or break the parts is greatly reduced, and to this end the rotary blower herein illustrated involves a number of important features, among which are the following, to wit:

a. The rotor, which is disposed on an axis extending substantially forwardly and rearwardly of the plow, involves a circumferentially spaced series of blades that extend approximately radially and longitudinally of the rotor axis and these blades and the blower casing enclosing the same are made comparatively very much deeper axially of the rotor as compared to the blades of prior art rotors, whereby snow or other material fed rapidly into the mouth of the blower will be radially discharged from the rotor blades before it reaches the back of the rotor and has an opportunity to become packed and produce a choking action on the rotor;

b. To the above end, the improved rotor, which is disposed on an axis extending substantially forwardly and rearwardly of the plow, is provided with a circumferentially spaced series of radially and forwardly and rearwardly extending blades having leading edges that are generally directed forwardly and radially inwardly, whereby to define a rotor having a front end of generally conical shape. The importance of this feature lies in the fact that deeply banked and heavily packed snow or other material encountered by the rotor will be engaged first by the most forwardly projecting portions of the rotor blades located closest to the axis of the rotor where the power of the rotor is greatest, and by the time the radially outer portions of the blades engage the tightly packed snow or other material the core or center portion thereof will have been bored out to the extent that there will be a tendency of the mass to collapse rather than to form a rigid bridge across the face of the blower; and c. Another feature leading to the improved efficiency noted above is the provision of teeth on the leading edges of the rotor blades, and which feature is particularly important in combination with features a and b above. Preferably, the teeth on the radially inwardly and forwardly directed leading edges of the blades are curved in the direction of rotation of the blades for the purpose of accelerating the rate of rearward movement of the material axially of the rotor to thereby more evenly distribute the same over the axial depth of the rotor blades to further reduce the tendency to choke the rotor.

As another important feature of the invention, I mount the rotor and rotor casing independently and at spaced places on a structure having sufficient resilience to permit a relatively small, but nevertheless, very important, approximately radial movement of the rotor with respect to its casing, whereby when the load pressure between the rotor and rotor casing at any point about the circumference of the casing becomes excessive the rotor will move radially away from the rotor casing at the point of congestion and thereby relieve the congestion and prevent or greatly reduce the tendency to stall the rotor under such conditions.

A still further object of the invention is the provision of an improved rotor and rotor mounting construction involving a shear-pin and shear-pin retaining means.

The above and other highly important objects and advantages of the invention will be made apparent from the following specification, claims, and appended drawings.

In the drawings, like characters indicate like parts throughout the several views.

Referring to the drawings:

Fig. 1 is a view in side elevation of the plow, also showing a portion of the propelling vehicle;

Fig. 2 is a view in front elevation of said plow;

Fig. 3 is a vertical section taken substantially on line 3—3 of Fig. 5, as indicated by the arrows;

3

Fig. 4 is for the most part a plan view of the parts shown in Fig. 1, a portion of the same being shown in horizontal section taken substantially on line 4—4 of Fig. 2, as indicated by the arrows; and Fig. 5 is a horizontal section taken substantially on line 5—5 of Fig. 2, as indicated by the arrows, the same being shown on an enlarged scale.

In the drawings, a snow plow of general V-type is shown comprising a central cutting plate or blade 10. This blade or plate is disposed centrally of the plow and extends in an upward direction, as shown clearly in Fig. 1. The lower portion of blade 10 extends forwardly at a rather sharp angle to the horizontal, as shown at 10a, and blades or plates 11 extend outwardly and rearwardly respectively from the portion 10a. A pair of moldboards 12 are provided which extend outwardly and rearwardly from central plate 10 or the center line of the plow and the sides of these moldboards aline with the outer side edges of the plates 11, as clearly shown in Figs. 2 and 4. The moldboards 12 as usual are somewhat concave on their front surfaces, as clearly shown in the drawings, particularly Fig. 4. The moldboards 12 are provided at their upper edges with reinforcing flanges 13. These flanges are connected by a sector-shaped gusset plate 14 having a forwardly directed pointed portion disposed at the top of plate 10, said gusset plate being disposed symmetrically with relation to plate 10. A plurality of bracing bars 15 are secured to the rear of moldboards 12, which moldboards will be formed of a curved plate. A frame bar 17, which may be in the form of an angle bar, as shown in Fig. 1, extends transversely of the plow adjacent the lower portion thereof in the rear of and beneath an intermediate portion of the moldboards 12. A pair of ground-engaging members in the form of skid shoes 18 are provided, the same being secured to frame bar 17 in any suitable manner as by bolts or welding. The shoes 18 have rear portions 18a adapted to engage the ground or supporting surface and have forwardly projecting portions 18b having their lower sides disposed somewhat above the supporting surface. The shoes also have vertical portions 18c disposed just in front of bar 17. Plates 19 are connected by suitable rivets or bolts 20 to portions 18b and 18c and are also suitably connected to the rear or underside of moldboards 12 in any suitable manner. Eye bolts 22 are shown secured adjacent the outer ends of bar 17, the same being equipped with nuts 23 below said bar. Cables 24 are secured respectively to eyebolts 22 and extend upwardly and rearwardly therefrom and pass over sheaves 25 carried on the upper ends of plunger rods 26 of hydraulic lifting jacks, the cylinders of which are indicated by 27. The cylinders 27 of the lifting jacks are each disposed between an opposite pair of plate-like elements 28 forming part of an auxiliary frame structure that is rigidly carried by the frame 29 of a power-driven vehicle 30. The other ends of the cables 24 are anchored to the vehicle 30, as by bolts 31 secured each to a plate 28 of an opposite pair of said plates. The upper ends of plates 28 of each pair thereof are rigidly connected by rivets or the like as at 33, and said opposite pairs of plates are located adjacent opposite sides of the front end of the vehicle 30. Brace rods 32 extend rearwardly, one from each pair of plates 28 along its respective side of the vehicle, and are anchored at their rear ends to the vehicle frame 29 at 34. The above noted auxiliary frame structure comprises, in addition to plates 28 and cross bar 29a, plate-like auxiliary frame elements 30a rigidly anchored to opposite sides of the vehicle frame 29 and to the cross member 29a, a short cross member 30b, and apertured anchoring clips or brackets 35 depending from cross bar 30b.

Push bars 37, having upwardly extending apertured anchoring lugs 37a, are pivotally connected to the brackets 35 by pivot bolts 38 passed through apertures in members 35 and 37a. These push bars 37, of which there are two located adjacent opposite sides of the vehicle, are suitably rigidly connected to the plow structure at their forward ends and are intermediately cross connected by a cylindrical cross member 29b.

One of the moldboards 12, specifically that shown at the left in Fig. 2, is apertured to have disposed therein a snow cutting, moving, and discharging rotor 40. A blower casing 41 of general cylindrical form surrounds the rotor 40 and thus extends rearwardly from the front of the moldboard, said casing having at the outer side thereof, directly behind the constriction-producing deflector 12b, an upwardly extending tangential discharge spout 42 which is rectangular in cross section, as shown in Fig. 4, and which flares upwardly, as shown in Fig. 2. A snow discharging spout or chute 43 is secured to the top of spout 42 by screws or rivets 44, and chute 43 is shown as curving transversely over the top of the plow and extending to one side thereof. Chute 43 has parallel sides connected by a top 43a and said sides taper in width, as clearly shown in Fig. 2, the same tapering to a point at the outer end of the chute. Chute 43 is supported by vertical bars 45 secured to its opposite sides respectively in any suitable manner as by bolts or rivets 46. Bars 45, which may be of any suitable form and are illustrated as angle bars, extend downwardly and are secured to the frame of the plow in any suitable manner. The rearmost bar 45 is conveniently connected to the angle bar 17 extending transversely in the rear of the moldboards, and the other bar 45 could be connected to one of the brace bars 15. Alternatively the chute 43 could be directed to the opposite side of the plow, as indicated by dotted lines in Fig. 2.

The moldboard 12 in which the rotor 40 is disposed has surfaces 12a above the rotor which slope inwardly toward the rotor so as to move the snow thereinto. A plate or deflector 12b is disposed at the outer side of rotor 12 and this has its forward end directed inwardly at an angle toward the rotor. It will be seen from Figs. 2 and 5 that the deflector 12b extends inwardly of the peripheral wall of casing 41 and somewhat inwardly of the periphery of the rotor 40 and thereby constricts the intake opening or mouth of the casing. The moldboard below the rotor 40 slopes upwardly and inwardly and the surface of the moldboard at the inner side of the rotor slopes rearwardly so that all of the surfaces surrounding the rotor act to move the snow into the rotor.

The rotor 40 has a central hub 40a which is elongated forwardly to form in effect a sleeve 40b. A rear plate 40d extends outwardly from hub 40a and while this could be variously formed or attached, in the embodiment of the invention as illustrated it is shown as integral with hub 40a. As shown in Fig. 2, this plate 40d is hexagonal in shape. Casing 41 also has a rear wall or plate 41a closely adjacent plate 40d and the wall 41a has a rather large central opening therethrough. Hub 40a has extending outwardly therefrom radially a plurality of circumferentially spaced ribs 40e. These ribs extend along sleeve 40b and also along the front of plate 40d. A plurality of plates or blades 40f are secured respectively to the ribs 40e. Plates 40f have inner sides secured to ribs 40e by the bolts or rivets 40g and said plates or blades have rear edges engaging plate 40d, said edges being secured to the ribs 40b by the bolts or rivets 40g. Plates 40f are thus secured along their inner and rear edges. As shown in Fig. 5, casing 41 is rather deep and the plates or blades 40f are of considerably greater dimension in length than in radial width. Blades 40f are provided at their forward portions with circumferentially spaced teeth 40h, which teeth are provided with sharp points, the center lines of which are directed inwardly at a substantial angle to the axis of the rotor, and it will be noticed that the teeth closer to the axis project forwardly farther than the teeth more remote from said axis. The blades 40f are curved slightly at the portions thereof having the teeth 40h thereon, which curvature is in the direction of rotation of rotor 40. Blades 40f may be reinforced by angle bars 40i secured along their sides in any suitable manner as by bolts or rivets 40j. A shaft 50 is provided, the forward protion of which extends through and fits in the bore of hub 40a and its sleeve 40b. The outer end of said shaft is reduced in diameter and threaded and a washer 50a is held thereon by a bolt 50b. The washer 50a is of greater diameter than the bore in sleeve 40b and would prevent said sleeve and the rotor from moving off of shaft 50. A headed pin 47 extends through hub 40a and shaft 50 and the head thereof is engaged by a cotter pin 48 extending through alined holes in a pair of the ribs 40e and the blades 40f, as shown in Fig. 3. Cotter pin 48 thus holds the pin 47 in place. A gear and clutch casing or housing 51 is provided, the same having a lug 51a secured by a headed bolt 52 to a bar 53 supported from bar 17. Said casing has an annular flange 51b at one end which is connected by headed bolts 53a to the frame or casing of a motor 54. Motor 54 is supported upon suitable frame bars or brackets 55 secured to frame bar 17 and extending upwardly and rearwardly therefrom. While motor 54 could be of various types, an internal combustion engine or motor has been found to be satisfactory. Casing 51 has a tapered portion surrounding shaft 50, to one end of which is secured by headed bolts 57 a flanged collar 58. The end of said tapered portion is apertured to receive shaft 50 and is counter-bored to have disposed therein a bearing 59 for shaft 50, said bearing being illustrated as of the ball type. Shaft 50 is shown as provided with an integral collar 50c engaging the inner side of the ball bearing 59. Casing 51 has an inwardly projecting flange or rib 51c which is bored to have disposed and secured therein a ball bearing 60 for shaft 50. At the rear side of bearing 60 shaft 50 has secured thereto a beveled gear 61, the hub of which engages bearing 60. Shaft 50 has an integral collar 50d thereon engaging the forward side of bearing 60. Beveled gear 61 meshes with the beveled pinion 62 secured to a shaft 63 journalled in a bearing 51d of casing 51 and in a bearing secured in an apertured side of casing 51, which side is closed by a flanged cap 51e secured by bolts 65 to casing 51. Pinion 62 engages the hub of a spur gear 66 also secured to shaft 63 and with which meshes a spur pinion 67 secured to a clutch shaft 68 journalled in bearings 69 disposed in a hub of casing 51 and held therein by a threaded plug 70. Pinion 67 is held on shaft 68 by a washer 71 held in place by a nut 72 threaded on shaft 68. A portion of a clutch 74 is shown and is secured to shaft 68. A cap 51f has a portion fitting into an aperture in casing 51 and is held in place by a stud 76 threaded into a portion of casing 51. Casing 51 is additionally secured in place by a headed bolt 77 extending through a lug 51g and into a suitable support. Clutch 74 will be engaged and disengaged by a clutch pedal secured to the driving shaft of motor 54 in the usual and well-known manner. A fuel supply conduit 80 is shown extending from motor 54 to a suitable supply tank on vehicle 30. Vehicle 30 will be usually an automotive truck or tractor supported upon tire-equipped wheels 30c.

In operation motor 54 will be operated and the plow will be propelled along the road or field to be cleared by vehicle 30. The plow will rest upon the skid shoes 18 which will support most of the weight thereof. The plates 11 will be substantially in contact with the surface to be cleared and will move therealong. The plow can be raised to be moved from place to place when not in operation by means of the fluid-operated plungers 26. Suitable fluid, such as liquid or air, will be turned into the cylinders 27 so as to elevate plunger rods 26 and the sheaves 25. This will pull upon the cables 24 and lift the plow. The push bars 37 will swing about the pivot bolts 38. As the plow is pushed forward the material such as snow which is to be moved will be engaged by plates 11 and by the moldboards 12. The material is moved outwardly along the moldboards by the curvature thereof. The snow at the side of the plow having the rotor 40 will be engaged by the blades 40f and the teeth 40h thereon. The snow will first be engaged by the teeth 40h nearest the axis of the rotor. As the plow moves forward the teeth farthest from the axis of the rotor will then also engage the snow. This successive engagement of snow or other material first by the radially innermost teeth 40h and subsequently by the radially outermost teeth 40h is particularly important in going through deep banks of hard packed snow or analogous material, in that it prevents bridging of the snow or the like across the interior of the rotor casing. The teeth 40h are sharp and pointed and will act to effectively cut and break up any hard material such as frost, ice, frozen snow, etc. before it passes through the rotor casing. As stated, the teeth 40h are curved slightly in the direction of rotation of rotor 40 which rotates, as indicated by the arrow in Fig. 2. The teeth 40h thus have a slicing effect and tend to cut or slice into the snow or frozen material. The material at the side of the plow having the rotor therein is moved toward the rotor by the surface of the moldboard including the surfaces 12a and 12c. The front end of the rotor, as stated, cuts the snow or other material and starts it in motion toward the rear of the rotor casing 41. As the snow or other material travels toward the rear of said casing the rotation of the rotor increases the velocity of the snow or other material and the centrifugal force causes it to move radially of the blades 40f until it reaches a point where it is discharged through the chute 42. The rotor revolves at high speed and the snow is projected through the spout 42 and into the chute 43 at high velocity so that it travels along the top 43 of the latter and is guided to one side of the plow by said top and discharged at said side. As above pointed out, the front end of plate or deflector 12b extends inwardly of the periphery of the rotor, as shown in Figs. 2 and 5. As shown in Fig. 5, the blades 40f project radially beyond the inner edge of deflector plate 12b to form a space into which the snow can expand after passing the edge of plate 12b and this expansion tends to keep the snow loose and prevents packing of the snow in casing 41. The rotor is efficiently driven from motor 54 through the gears 67, 66, 62 and 61, and this drive is direct and positive and effected without the use of universal joints. The pin 47 will be sufficiently fragile to shear off in case excessive stress is placed upon the rotor blades 40f. The snow at one side of the central cutting plate 10 is thus discharged through the chute 43. The snow at the other side of plate 10 will be moved by the moldboard 12 and formed into a windrow at the outer side of said moldboard. The driving gears for rotor 40 are effectively protected by casing 51, which casing can contain a suitable lubricant. It will be noted that motor 54 is disposed largely at the opposite side of plate 10 from rotor 40. A good balance on the plow transversely thereof is thus maintained. The depth and diameter of the rotor housing are determined by the amount of horsepower of the motor 54. A plow with a motor of 75 horsepower will drive a rotor 36 inches in diameter and 24 inches deep. A motor of 200 horsepower will drive a rotor in a rotor housing which is more than 24 inches deep and more than 36 inches in diameter. The number of blades on the rotor can be varied as desired. The plow thus is moved along the road or field and removes a portion of the snow and forms a windrow. On the next trip the side of the plow having the rotor therein can be moved along through the windrow so that the snow in the windrow and a zone at either side thereof will be removed.

In practice, it has been found that the rotor of the present plow is exceptionally efficient and will handle a larger volume of snow or similar material per minute per unit of energy consumed than will conventional rotors used for this purpose, and some of the important features of my novel design which result in this improved efficiency are as follows, to wit:

a. The use of rotor blades of unusual axial depth with respect to radial length (preferably of as great or greater axial depth than radial length, but not less than two-thirds as deep as long) is an important contributing factor to the over-all efficiency of the rotor in that when snow or the like is moved rapidly into the mouth of the rotor casing, as when encountering a snow bank, the blades will have ample opportunity to set the snow in motion and centrifugally discharge the same from the rotor casing before the said snow or the like has an opportunity to strike the back surface of the blower rotor or casing and become packed.

b. The teeth on the leading edges of the rotor blades tend to break up or pulverize tightly packed snow, ice, or the like for delivery to the blades in a condition for efficient centrifugal discharge, and greatly reduce the resistance to rotary motion of the blades as compared to blades with unbroken or smooth leading edges, thereby further reducing the power required to handle a given amount of material in a given period of time;

c. Because the rotor teeth 40h on the radially innermost edges of the rotor blades extend axially forward of the teeth 40h closer to the radially outer ends of the blades, hard banks of snow and the like are progressively engaged first by the radially inner blades where the driving force is the greatest, and then by the radially outer blades where the driving force is essentially less. This progressive engagement of the snow further reduces the power required to drive the rotor under certain conditions for the reason that it prevents or greatly reduces the tendency to completely bridge the mouth or mouth and interior of the blower casing with tightly packed material to be moved;

d. The structure between the points of driving connection between the motor power take-off shaft and the rotor shaft 50 and also between the rotor casing 41 and the rotor shaft 50 are resilient and yieldable to an extent to permit approximate radial movements between the rotor and its casing under excessive load conditions. This permits the blades of the rotor 40 to be moved slightly away from the casing at the point of excessive load to automatically provide for the desirable additional clearance during such conditions.

From the above description, it will be seen that I have provided a comparatively simple and very efficient plow which will quickly and effectively remove snow or other material from a surface. It will be obvious that the device will have a high degree of utility for the purpose intended.

It is further important to note that the rotor is slightly eccentric to the rotor casing; the space beween the circle described by the tips of the rotor blades 40f and the peripheral wall of the rotor casing being at minimum at a point approximately forty-five degrees (45°) from a vertical plane extending through the axis of the rotor in the direction of rotation of the rotor and increasing from such point in the direction of rotation of the blades toward the tangential outlet. In other words, the space between the circle described by the rotor blades and the inner periphery of the blower casing is greatest at a point directly forwardly of the tangential outlet passage. This feature is important in that it provides for a gradually increasing clearance between the blades and casing from the time they pick up a load until they discharge the same and thereby further reduces the tendency to clog and bind the rotor under excessive load conditions.

It will, of course, be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. In a rotary plow, a pair of rearwardly and outwardly flaring moldboards, a rotor casing mounted on and opening forwardly through one of said moldboards, a multi-blade rotor in said rotor casing on a substantially horizontal axis extending generally longitudinally of the plow, a motor having a power take-off shaft mounted back of the other of said moldboards and disposed transversely with respect to a longitudinal center line through the plow, a rotor shaft supported from said motor and having driving connections with the motor power take-off shaft, the structure between the points of driving connection between said motor power take-off shaft and said rotor shaft and between said rotor casing and rotor shaft being sufficiently resilient to permit of approximate radial movements between the rotor and casing under excessive load conditions, whereby the rotor blades may move away from the casing at the point of excessive load to automatically provide additional clearance during such conditions.

2. In a rotary plow, a pair of rearwardly and outwardly flaring moldboards, a rotor casing mounted on and opening forwardly through one of said moldboards, a multi-blade rotor in said rotor casing on a substantially horizontal axis extending approximately longitudinally of the plow, a motor mounted back of the other of said moldboards and disposed transversely with respect to a longitudinal center line through the plow, a combined clutch and gear housing rigidly carried by the motor, said rotor being mounted on the projected end portion of a rotor shaft journalled in said combined clutch and gear housing, and driving connections between said rotor shaft and motor comprising gears and clutches located in said housing, the structure between the points of motor and housing mounting and said rotor casing being sufficiently resilient to permit of approximately radial movements between the rotor and casing under excessive load conditions, whereby under such excessive load conditions the rotor blades may move away from the casing at the point of excessive load to automatically provide additional clearance and reduce the tendency to stall the motor.

MATHER GARLAND.

REFERENCES CITED

The following references are of record in the file of this patent:

UNITED STATES PATENTS

| Number | Name | Date |
| --- | --- | --- |
| 395,548 | Corbett | Jan. 1, 1889 |
| 1,387,576 | Worth | Aug. 16, 1921 |
| 1,483,080 | Currie | Feb. 12, 1924 |
| 1,483,586 | Larson | Feb. 12, 1924 |
| 1,490,585 | Brewczynski | Apr. 15, 1924 |
| 1,563,920 | Peters et al. | Dec. 1, 1925 |
| 1,822,827 | Shappell | Sept. 8, 1931 |
| 2,024,551 | Thornhill | Dec. 17, 1935 |
| 2,137,321 | Austin | Nov. 22, 1938 |
| 2,152,200 | McCulley | Mar. 28, 1939 |
| 2,281,289 | Hewitt | Apr. 28, 1942 |
| 2,315,007 | Morse et al. | Mar. 30, 1943 |
| 2,536,166 | Garland | Jan. 2, 1951 |

FOREIGN PATENTS

| Number | Country | Date |
| --- | --- | --- |
| 60,500 | Norway | Feb. 27, 1939 |
| 62,379 | Sweden | Feb. 15, 1927 |